United States Patent [19]
Fukushima et al.

[11] Patent Number: 5,931,272
[45] Date of Patent: Aug. 3, 1999

[54] TORQUE RESPONSIVE ROTATION CONTROL DEVICE

[75] Inventors: Shigeaki Fukushima, Hamamatsu; Tatsuo Kawase, Iwata, both of Japan

[73] Assignee: NTN Corporation, Osaka, Japan

[21] Appl. No.: 09/069,286

[22] Filed: Apr. 29, 1998

[30]     Foreign Application Priority Data

May 2, 1997  [JP]  Japan ..................................... 9-114655

[51] Int. Cl.⁶ .................................................. F16C 41/00
[52] U.S. Cl. .................................... 192/54.52; 192/56.62; 192/89.21; 464/36
[58] Field of Search ............................... 192/54.52, 55.1, 192/56.62, 89.21, 93 A; 464/35, 36

[56]          References Cited

U.S. PATENT DOCUMENTS

2,501,648  3/1950  Ogden .................................. 192/55.1 X
4,365,961  12/1982  Weilenmann et al. ..................... 464/36
4,538,715  9/1985  Konrad et al. ................... 192/89.21 X

*Primary Examiner*—Richard M. Lorence
*Attorney, Agent, or Firm*—Sughrue, Mion, Zinn, Macpeak & Seas, PLLC

[57]            ABSTRACT

An input-side rotary member 20, including an input gear 7, and an output-side rotary member 19, including a torque cam 1 fixedly mounted on an output shaft 12, are provided on the same axis of rotation. The input-side rotary member 20 is provided with an input cage 3 having a plurality of radially extending pockets 30 and balls 9 movably accommodated within the respective pockets 30. The torque cam 1 is provided with a generally annular cam groove 31 in which the balls 9 move rollingly, which groove 31 is of a shape having a distance from the axis of rotation that varies continuously. A presser member 2 is provided with a pressing face 2*a* by which the balls 9 are urged by a spring element 4. In this way, the input rotation of, for example, an engine can be reduced and then transmitted to a driven device such as an engine auxiliary equipment 102 with respect to the boundary set by a preset torque value.

6 Claims, 13 Drawing Sheets

TORQUE RESPONSIVE ROTATION CONTROL DEVICE

BACKGROUND OF THE INVENTION

1. Field of the Invention

The present invention relates to a torque responsive rotation control device for use in association with an auxiliary equipment of an engine, or a machine or device driven by a prime mover such as, for example, an electric motor.

2. Description of the Prior Art

Figure 15:
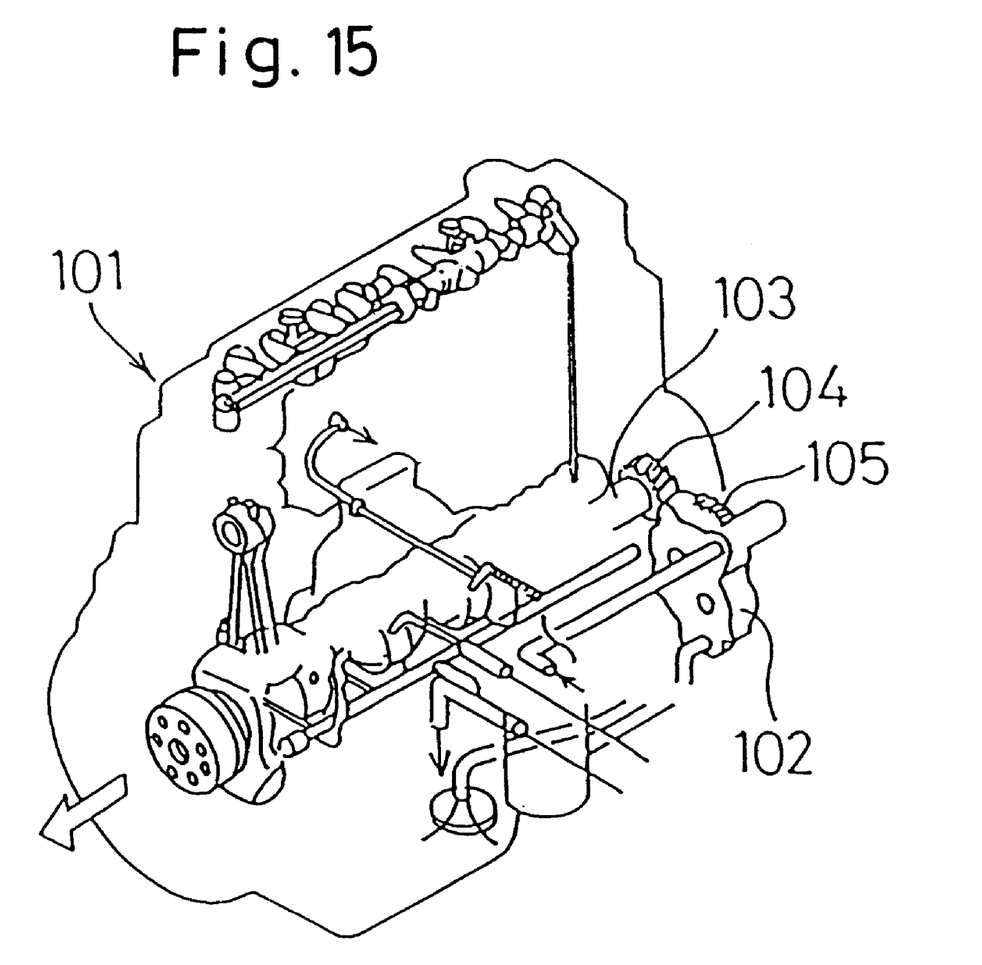
FIG. 15 is a schematic perspective diagram showing the connection between the conventional engine and the engine auxiliary equipment.

As is well known to those skilled in the art, an engine auxiliary equipment is directly driven by a crankshaft of an engine, for example, an internal combustion engine, through a pulley or a gear train, an example of which is shown in FIG. 15.

As shown in FIG. 15, an oil pump 102 which is an auxiliary equipment of the engine 101 includes an oil pump gear 105 meshing with a crank gear 104 mounted on the crankshaft 103 for rotation together therewith. The oil pump 102 shown therein is in the form of a gear pump and is operable to circulate a lubricant oil for the engine 101 in a manner known to those skilled in the art.

As discussed above, the engine auxiliary equipment such as the oil pump 102 is driven directly by the crankshaft 103 of the engine 101 and, therefore, when the engine auxiliary equipment is designed to give a sufficient performance at a low rotational speed of the engine 101, the performance of the engine auxiliary equipment will become so excessive at a high rotational speed of the engine 101 as to result in a loss of the engine output. On the other hand, in terms of the design of the engine auxiliary equipment, the engine auxiliary equipment must be so designed as to ensure the lifetime at a high speed region of the engine at which the performance of the engine auxiliary equipment becomes too excessive and, therefore, not only is reduction in size of the equipment hampered, but also it constitutes a cause of reduction in fuel efficiency.

SUMMARY OF THE INVENTION

Accordingly, the present invention has for its primary object to provide a torque responsive rotation control device capable of contributing to reduction in size and increase in fuel efficiency of a driven device such as the engine auxiliary equipment by reducing an input rotation, provided for by a prime mover such as an engine, in a region having a torque greater than a predetermined value and then transmitting it to an output shaft coupled with the driven device.

Another important object of the present invention is to provide the torque responsive rotation control device of a type referred to above, wherein a smoothly reduced rotation can be obtained.

A further object of the present invention is to provide the torque responsive rotation control device of a type referred to above, wherein a load which would be imposed on a cam groove at a high rotation region can be lessened and a frictional wear of surfaces of contact of the cam groove and the balls is minimized to thereby increase the lifetime thereof.

A still further object of the present invention is to provide the torque responsive rotation control device of a type referred to above, wherein torque can be transmitted smoothly.

A yet further object of the present invention is to provide the torque responsive rotation control device of a type referred to above, wherein a frictional wear of an elastic element is prevented to increase the lifetime thereof.

In order to accomplish these and other objects and features of the present invention, there is provided in accordance with the present invention a torque responsive rotation control device which comprises an input-side rotary member and an output-side rotary member rotatable about a common axis and independent from each other; a cage having a plurality of pockets defined therein so as to extend radially and including balls movably accommodated within the corresponding pockets; a presser member having a pressing face defined therein in coaxial relation to an axis of rotation thereof and inclined against the axis; and an elastic element applying a pressing force or a biasing force to the presser member to cause the annular recess or protrusion to urge the balls towards such one of the input-side and output-side rotary members. The cage is provided on one of the input-side and output-side rotary members, and the other of the input-side and output-side rotary members has a generally annular cam groove defined therein in coaxial relation to the common axis and being shaped to have a distance from the common axis varying continuously. The presser member is axially displaceably provided with the annular recess or protrusion confronting the cam groove in the other of the input-side and output-side rotary members.

In this structure, the operation of the torque responsive rotation control device in which the cage is provided on the input-side rotary member and the presser member employs the pressing face inclined radially inwardly against the axis will be discussed.

The balls are movably accommodated within the radially extending pockets in the cage and are urged towards the cam groove, defined in the output-side rotary member so as to have a radius that varies continuously, by the pressing face that is defined by the annular recess. The presser member is pressed from rear by the elastic element so as to produce an axial displacement according to the magnitude of the input torque.

As a result thereof, by the rotation transmitted to the cage on an input side, the balls moves radially outwardly within the cam groove in the output-side rotary member while being guided within and along the pockets in the cage, to thereby move the presser member axially against a reactive force of the elastic element. Up until a torque value corresponding to the reactive force of the elastic element, the balls will not move over portions of the cam groove at which the radius is maximum, and the input-side rotary member having the cage and the output-side rotary member having the cam groove while bringing about a small angle of retardation do not rotate relative to each other. In other words, up until the preset torque value, the number of revolutions of the input-side rotary member and that of the output-side rotary member match with each other.

Where the torque of a value greater than the reactive force of the elastic element is inputted, the balls ride over those portions of the cam groove at which the radius is maximum to move within the cam groove, resulting in a relative rotation between the input-side rotary member and the output-side rotary member.

Accordingly, where the input-side rotary member is drivingly coupled with, for example, an engine through gears or the like and the output-side rotary member is coupled directly with the auxiliary equipment, the auxiliary equipment will undergo rotation until the preset torque value is attained. But, when the input-side rotary member is driven at a speed higher than the number of revolutions at which the preset torque is exceeded, a relative rotation takes place between the input-side and output-side rotary members and, therefore, the auxiliary equipment will undergo rotation at a speed lower than the number of revolutions of the input-side rotary member.

Accordingly, the rotation inputted from the engine or the like can be reduced and is then transmitted to the engine auxiliary equipment or the like when the torque is higher than the preset torque with respect to the boundary of a predetermined value. In other words, in the auxiliary equipment of a type in which the number of revolutions thereof is uniquely determined by the driving torque, by setting a target torque, the rotation of the engine auxiliary equipment at a high speed region in which the torque of a value higher thin the target torque is imposed on the engine auxiliary equipment can be suppressed to reduce the amount of work which would tend to be excessive in the case where the engine and the auxiliary equipment are coupled directly with each other.

Where, however, the cage is provided on the output-side rotary member and the cam groove is defined in the input-side rotary member, rotation can be transmitted from the cam groove to the cage through the balls. However, so far as the relative rotation takes place in dependence on the number of revolutions, a description similar to that in the foregoing equally applies.

Also, where the pressing face in the presser member is inclined radially outwardly, the balls are urged radially outwardly by the presser member in a manner substantially opposite to that described hereinbefore, and at the number of revolutions at which the preset torque value has not been attained, the balls are unable to move over the minimum radius portions of the cam groove and the rotational speeds of the input-side rotary member and the output-side rotary member match with each other.

In the construction described above, the cam groove is preferably of a shape having the distance from the common axis that varies in a fashion similar to a generally sinusoidal wave, and wherein the pockets in the cage is equal in number to the number of dales of the sinusoidal wave occurring in one complete circumference of the cam groove and are equidistantly spaced from each other.

Where the cam groove is so shaped as to represent the generally sinusoidal shape, rolling motion of the balls over maximum radius portions or minimum radius portions of the cam groove becomes smooth and transmission of torque takes place smoothly at the time a relative rotation takes place between the input-side and output-side rotary members.

In addition to the input gear, an input stand-by gear may be provided on an output shaft of the output-side rotary member through a oneway clutch for rotation in one direction, in which case first and second engine-side gears engageable with the input gear and the input stand-by gear, respectively, may be mounted on a common drive shaft. In such case, a relation among respective numbers of teeth of the various gears is preferably so chosen that only when the number of revolutions of the input stand-by gear exceeds the number of revolution of the output shaft, rotation can be transmitted from the second engine-side gear to the output shaft through the input stand-by gear and the one-way clutch.

By way of example, an input stand-by gear which is different from the input gear and which forms another gear pair is provided between a crank-shaft, which is also a drive shaft of the engine, and an output shaft, to thereby define another torque path separate from a path defined by the cam groove. Its reduction gear ratio (i.e., the ratio of the number of teeth of the input stand-by gear relative to the number of teeth of a second engine-side gear) is greater than the gear pair (the ratio of the number of teeth of the input gear relative to the number of teeth of a first engine-side gear) for transmitting the rotation through the cam groove, and the input stand-by gear is so supported that the torque can be transmitted to the output shaft only from the input side to the output side by means of the one-way clutch.

For this reason, if the number of revolutions of the output shaft decreases as a result of the relative rotation occurring between the cage and the cam groove with the torque exceeing the preset torque, the input stand-by gear is meshed and, finally, the torque can be transmitted from the input stand-by gear.

Where no second torque transmission path such as described above is employed, when the relative rotation occurs between the input-side rotary member and the output-side rotary member, the balls may rollingly slide within the cam groove and the cam groove will be quickly worn out if the preset torque is large. However, by the provision of the separate torque transmission path as hereinabove described so that the torque can be transmitted from the input stand-by gear to the output shaft in the event of occurrence of the relative rotation, occurrence of frictional wear of the cam groove can be lessened advantageously.

By way of example, in the case of the auxiliary equipment such as, for example, an oil pump, of the type in which the relationship between the number of revolutions of the auxiliary equipment and the driving torque can be approximated by a function having a positive inclination, the torque transmission takes place by means of the input gear pair at a low speed rotation of the engine whereas at a high speed region exceeding the preset value of the transmission torque, switching takes place onto the torque transmission by means of the input stand-by gear pair having a high reduction gear ratio and, therefore, the number of revolutions of the engine auxiliary equipment which tends to be excessive at the high speed region can advantageously be suppressed.

In the torque responsive rotation control device of the type discussed above, a support cylinder is preferably fitted over an outer periphery of the presser member so as to define an oil chamber for applying a hydraulic pressure to the presser member in an axial direction, an oil passage for supplying oil to the oil chamber is employed together with a discharge passage that is defined between the outer periphery of the presser member and a surface of the support cylinder engaging the outer periphery of the presser member. In such case, the oil chamber, the oil passage and the discharge passage altogether define a dumper.

The provision of the dumper is effective to increase the damping effect between the balls and the presser member at the time of selective engagement and disengagement of the cam grooves to thereby accomplish a smooth torque transmission.

Also, a torque cam having the cam groove defined therein may be used for rotation together with an output shaft, in which case the input-side rotary member is constituted by an input gear, rotatably mounted on an outer periphery of the torque cam through a rolling contact bearing and the cage fitted to this input gear, with the presser member supported by the output shaft for displacement axially of the output shaft through a slidable element.

The use of the mechanical rolling contact as a slidable element to support the presser member enhances a movability of the presser member and, accordingly, brings about improvement in response at the time of selective engagement and disengagement of the cam groove to thereby reduce the hysteresis of the transmitted torque as a result of increase or decrease of the number of revolutions of the engine.

Moreover, in the structure discussed above, a bearing may be interposed between the elastic element support member and the output shaft for permitting a relative rotation between the elastic element support member and the output shaft. The provision of the bearing is effective to permit a relative rotation between the elastic element support member and the output shaft to minimize a frictional wear of the elastic element to thereby increase the lifetime thereof.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whosoever, which scope is to be determined by the appended claims. In the accompanying drawings, like reference numerals are used to denote like parts throughout the several views, and:

DETAILED DESCRIPTION OF THE EMBODIMENTS

Figure 1:
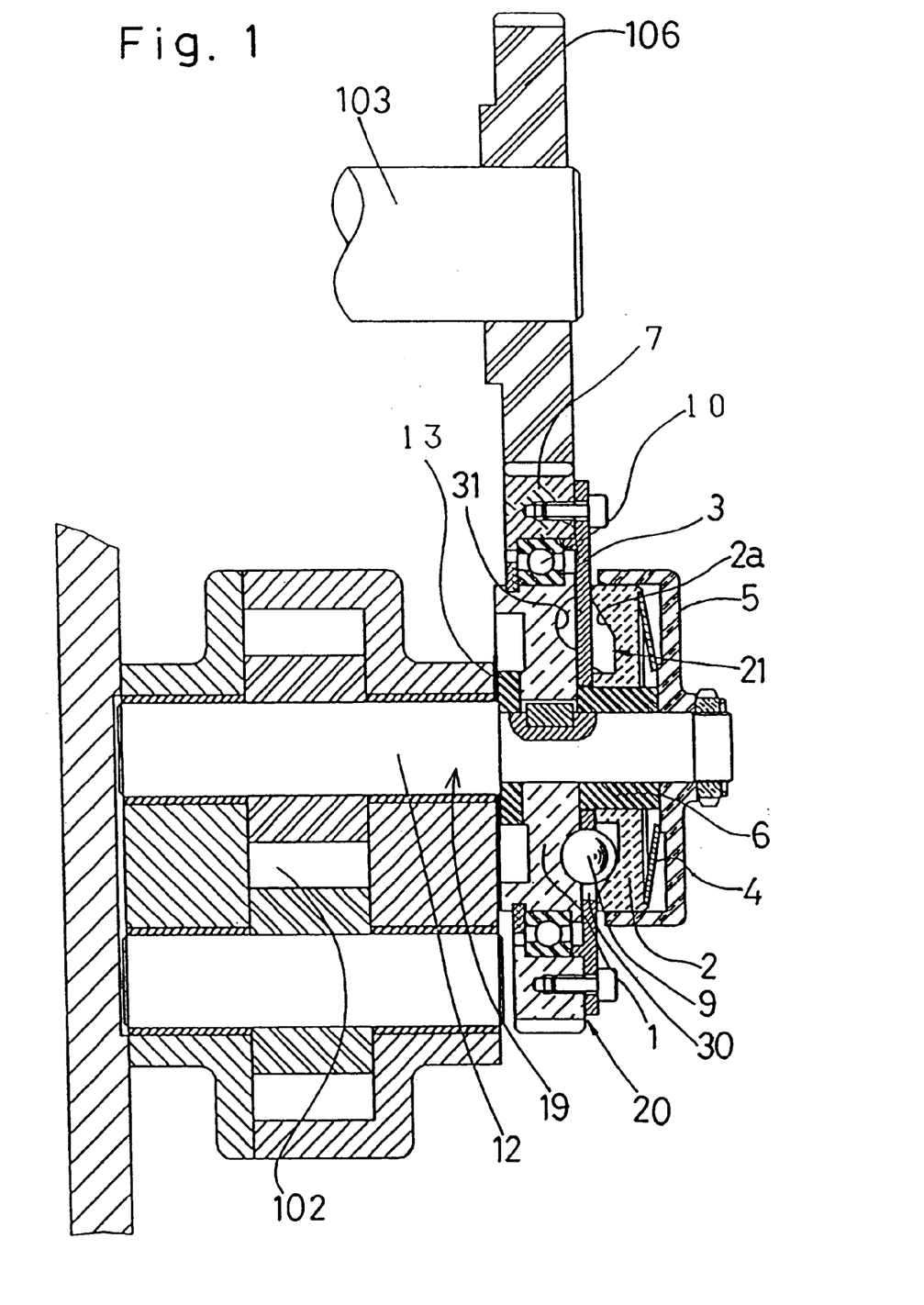
FIG. 1 is a longitudinal sectional view of a torque responsive rotation control device according to a first preferred embodiment of the present invention.

A torque responsive rotation control device according to a first preferred embodiment of the present invention will now be described with particular reference to FIGS. 1 to 7. Of these figures, FIG. 1 illustrates, in a longitudinal sectional representation, the torque responsive rotation control device shown as drivingly coupled with an engine auxiliary equipment. As shown therein, an input gear 7 is drivingly meshed with a first crank gear 106 that is press-fitted to a crankshaft 103 of the engine. This input gear 7 is mounted on a torque cam 1 through a bearing 10 so that the input gear 7 can rotate relative to the torque cam 1. The torque cam 1 is in turn fixedly coupled with an output shaft 12 by means of a key engagement or the like for rotation together therewith. This torque cam 1 and the output shaft 12 rotatable together therewith constitute an output-side rotary member 19. One of opposite ends of the output shaft 12 remote from the torque cam 1 is drivingly coupled to, or forms a part of, an input shaft of the engine auxiliary equipment which is, in the illustrated embodiment, an oil pump 102.

Figure 2:
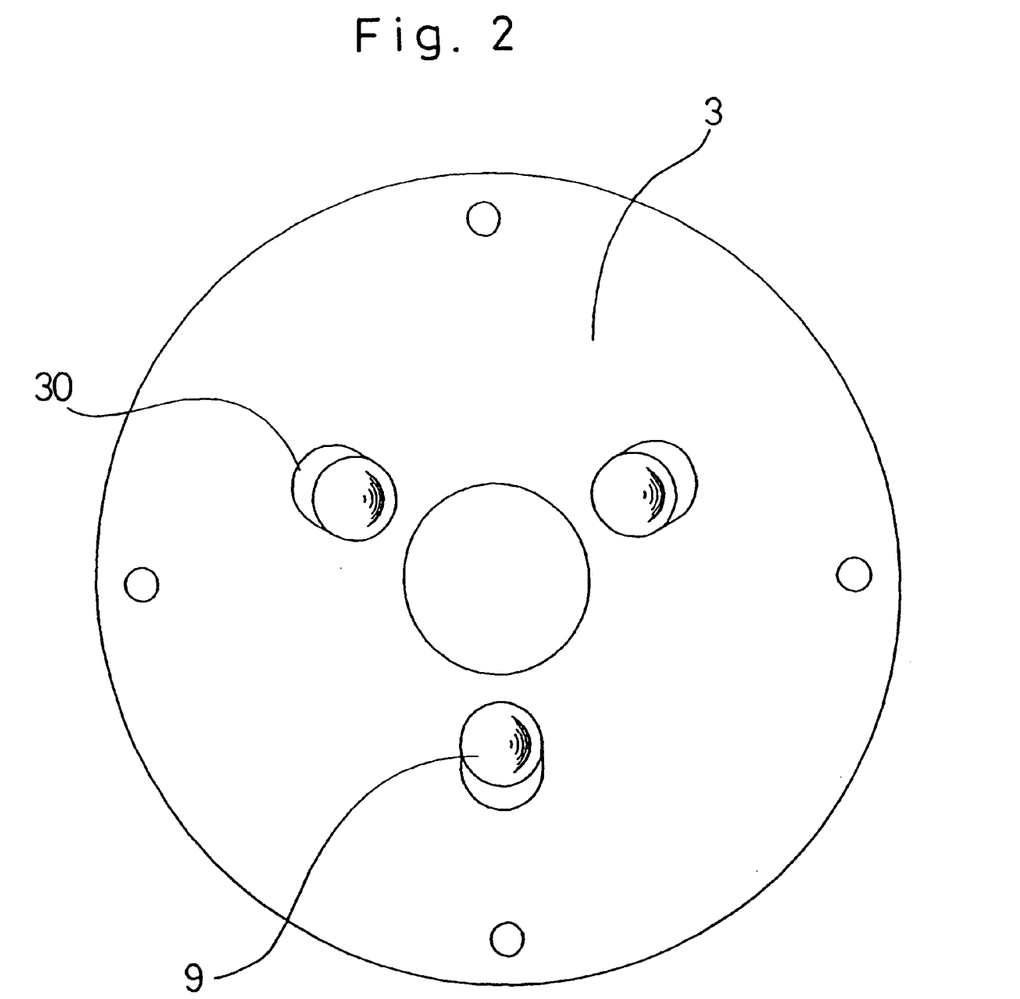
FIG. 2 is a front view of an input cage employed in the torque responsive rotation control device of FIG. 1, with the input cage shown in a stationary position.

The input gear 7 has a disc-shaped input cage 3 connected thereto by means of, for example, bolts for rotation together therewith. This input gear 7 and the input cage 3 altogether constitute an input-side rotary member 20. As best shown in FIG. 2, the input cage 3 has a plurality of, for example, three, circumferentially equally spaced pockets 30 of an equal size defined therein. Each of said pockets 30 is in the form of an elliptical opening made completely across the thickness of the input cage 3 and having a longitudinal axis oriented radially with respect to the center of the disc-shaped input cage 3. These elliptical pockets 30 accommodate therein respective balls of a diameter slightly smaller than the width of the respective elliptical pocket 30.

Figure 3A:
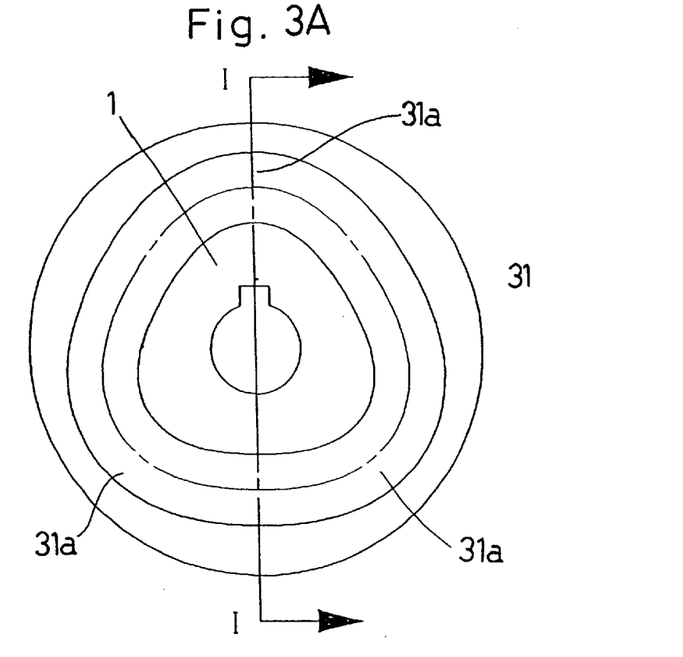
FIG. 3A is a front view of a torque cam employed in the torque responsive rotation device of FIG. 1.
Figure 3B:
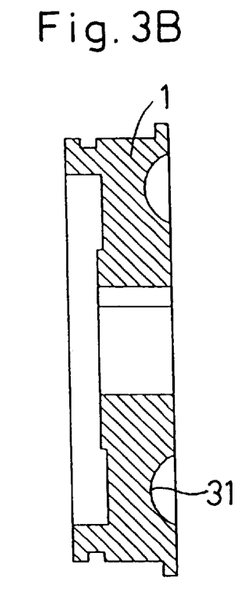
FIG. 3B is a cross-sectional view taken along the line I—I in FIG. 3A.
Figure 4A:
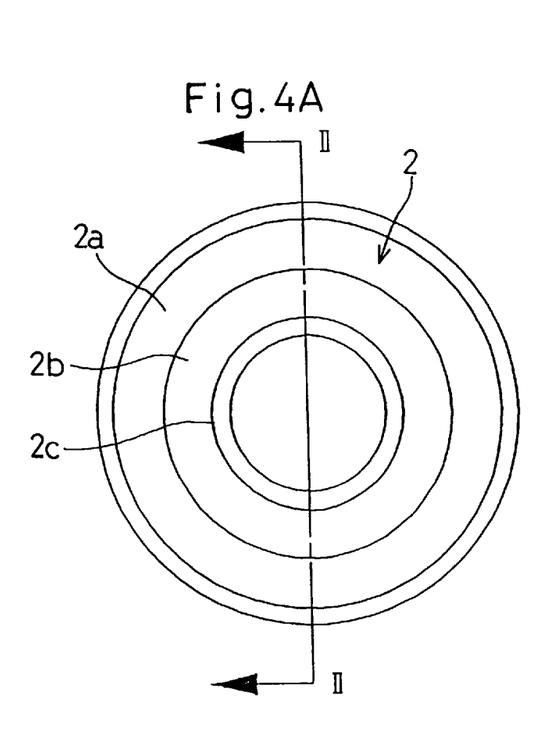
FIG. 4A is a front view of a presser member employed in the torque responsive rotation control device of FIG. 1.
Figure 4B:
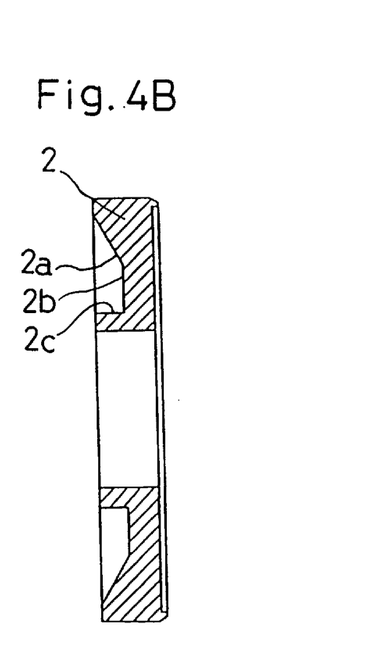
FIG. 4B is a cross-sectional view taken along the line II—II in FIG. 4A.

The balls 9 accommodated within the respective elliptical pockets 30 are rollingly sandwiched between the torque cam 1 and a presser member 2 which are positioned on respective sides of the input cage 3. More specifically, as best shown in FIGS. 3A and 3B, the torque cam 1 has one surface formed with a generally triangular cam groove 31 and, on the other hand, as best shown in FIGS. 4A and 4B, the presser member 2 has one surface formed with an axially inwardly extending annular recess coaxial with the output shaft 12 and delimited by a radially inwardly inclined annular wall 2a, an annular radial wall 2b and an annular axial wall 2c. In an assembled condition as shown in FIG. 1, the balls 9 loosely accommodated within the elliptical pockets 30 in the input cage 3 are accommodated in part within the cam groove 31 in the torque cam 1 and in part within the axially inwardly extending annular recess in the presser member 2 that is urged towards the input cage 3 and the torque cam 1 by means of an elastic element, for example, a spring washer 4.

The generally triangular cam groove 31 defined in the torque cam 1 provides a raceway for the balls 9 and is of a generally semi-circular cross-sectional shape of a fixed depth as best shown in FIG. 3B. As best shown in FIG. 3A, the cam groove 31 is of a shape in which the distance of the cam groove 31 from the axis of rotation of the torque cam 1 varies in a substantially sinusoidal fashion having a plurality of cam apex portions 31a equal in number to the number of the elliptical pockets 30 defined in the input cage 3. It is to be noted that each of the cam apex portions 31a is a point of the cam groove 31 that is radially outwardly spaced a maximum distance from the axis of rotation of the torque cam 1 and, hence, the longitudinal axis of the output shaft 12.

Referring still to FIG. 1, the presser member 2 is rotatably and axially movably mounted on a spacer sleeve 6 that is fixedly mounted on the output shaft 12. This presser member 2 is so configured and so supported as to move axially of the output shaft 12 along the spacer sleeve 6 when the balls 9 are forced to move within the pockets 30 in a direction radially of the input cage 3 against the pressing force of the spring washer 4 according to the magnitude of torque to be transmitted. It is, however, to be noted that any torque cannot be transmitted of a magnitude greater than a magnitude which would otherwise cause the balls 9 within the cam groove 31 in the torque cam 1 to ride over maximum radius portions of the cam groove 1.

The spring washer 4 used to urge the presser member 2 against the torque cam 1 as hereinabove described is interposed between the presser member 2 and a support cylinder 5, which is a support for the elastic element, fixedly mounted on the output shaft 12. The support cylinder 5 is generally in the form of a cap having a peripheral flange which is, in the assembled condition, engaged over an outer peripheral surface of the presser member 2. It is to be noted that the torque cam 1, the presser member 2 and the spring washer 4 altogether constitute a torque limiter mechanism 21. It is also to be noted that the spacer sleeve 6 may not be always essential in the practice of the present invention and the presser member 2 may be rotatably and axially movably mounted directly on the output shaft 12.

The operation of the torque responsive rotation control device of the above described construction will now be described. Assuming that the rotational speed of the engine is small, the torque outputted from the crankshaft 103 of the engine is transmitted to the input gear 7 through the first crank gear 106 and is then transmitted to the balls 9 through the input cage 3. As a result, the balls 9 move within the cam groove 31 in the torque cam 1 in a radial direction while being guided within and along the respective elliptical pockets 30 in the input cage 3. Since the presser member 2 pressed by the spring washer 4 towards the torque cam 1 urges the balls 9 towards the torque cam 1, movement of the balls 9 towards the cam apex portions 31a of the cam groove 31 results in an axial movement of the presser member 2 in a direction towards the support cylinder 5 against the spring washer 4.

Figure 5:
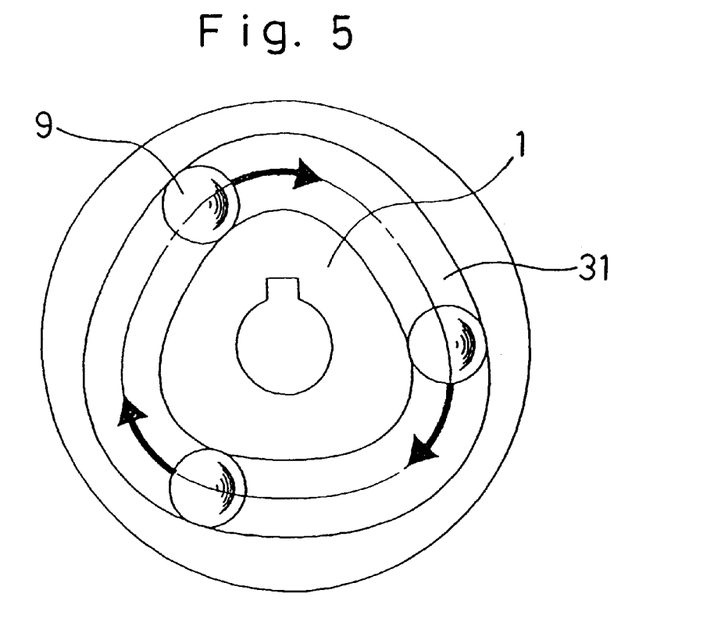
FIG. 5 is a front view of the torque cam during torque transmission.

When a magnitude of torque is small, the balls 9 will stand still within the cam groove 31 without reaching the cam apex portions 31a of the cam groove 31 as pressed by the spring washer 4. Consequently, the output shaft 12 is driven by the crankshaft 103 through the input gear 7, then through the balls 9 by way of the input cage 3 and finally through the torque cam 1 at a speed determined by the reduction gear ratio between the crank gear 106 and the input gear 7. Respective positions of the balls 9 within the cam groove 31 in the torque cam 1 at that time are shown in FIG. 5.

Figure 6:
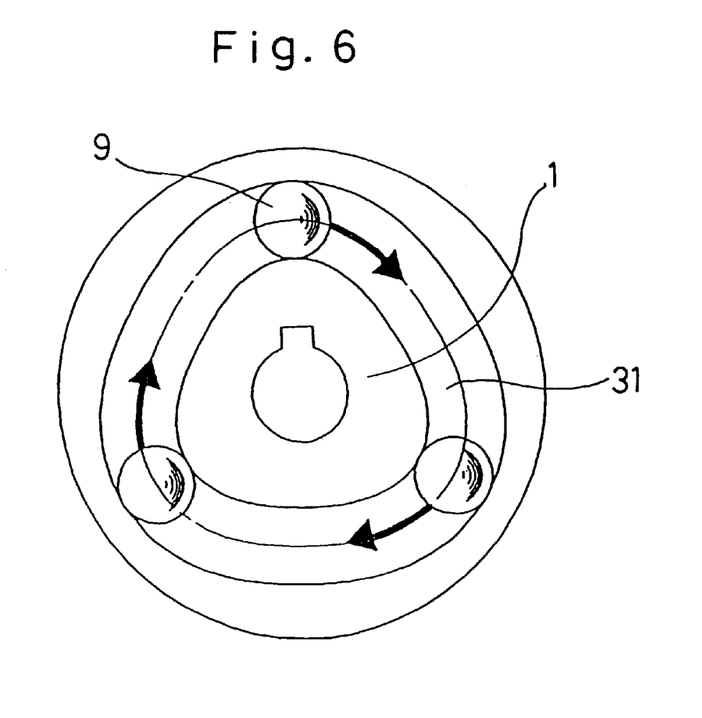
FIG. 6 is a front view of the torque cam, showing balls riding over respective cam apex portions of a cam groove in the torque cam.
Figure 7:
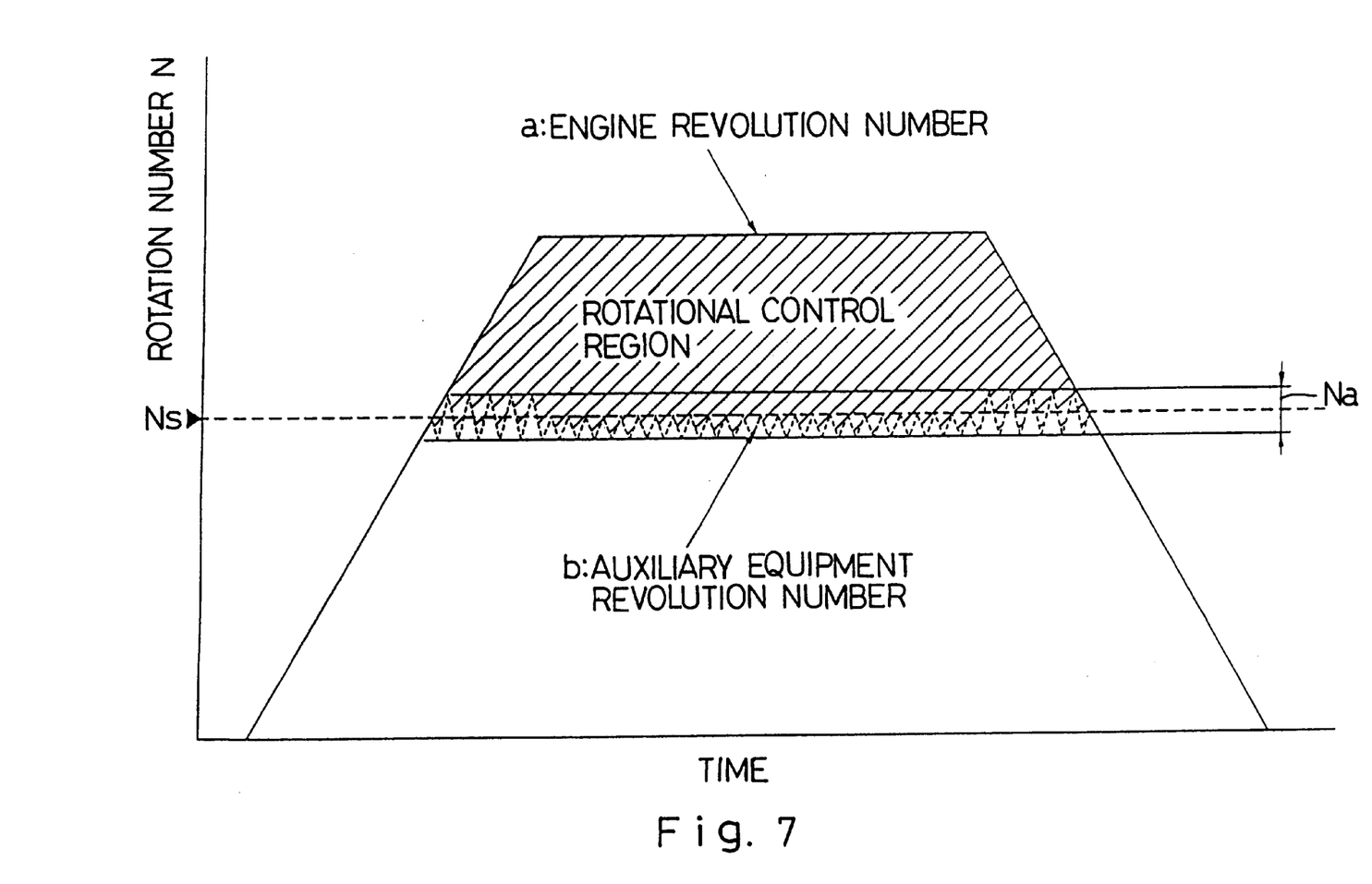
FIG. 7 is a schematic diagram showing the operation of the torque responsive rotation control device according to the first embodiment of the present invention.

As the number of revolution of the engine increases, the driving torque increases to a value sufficient to overcome the pressing force of the spring washer 4, at which time the balls 9 within the cam groove 31 ride over the respective cam apex portions 31a of the cam groove 31 as shown in FIG. 6. As the balls 9 ride over the respective cam apex portions 31a of the cam groove 31, the input cage 3 rotates relative to the torque cam 1. As a result thereof, a relative rotation taking place between the input gear 7 and the output shaft 12, and the output shaft 12 does not rotate at a speed higher than the torque determined by the pressing force of the spring washer 4.

According to the foregoing embodiment of the present invention, since the number of revolutions of the output shaft 12 does not exceed the number of revolutions corresponding to the preset torque. Accordingly, unlike the case in which the engine auxiliary equipment is coupled direct with the engine as is the case with the prior art, the number of revolutions of the engine auxiliary equipment can advantageously be restricted at a high rotational region of the engine while securing the performance of the engine auxiliary equipment at a low speed region. Accordingly, not only can a loss of the engine power at a high speed region be avoided, but also the engine auxiliary equipment can be manufactured compact in size. Specifically, referring to FIG. 7, a shaded area represents a rotation control region in which an energy loss can be recovered. In this figure, a curve a represents change in number of revolutions of the engine with passage of time, a curve b represents the number of revolution of the engine auxiliary equipment, Ns represents a preset value for actuation of the torque cam, that is, the torque limiter, and Na represents a synchronization width exhibited by the torque cam.

Figure 8:
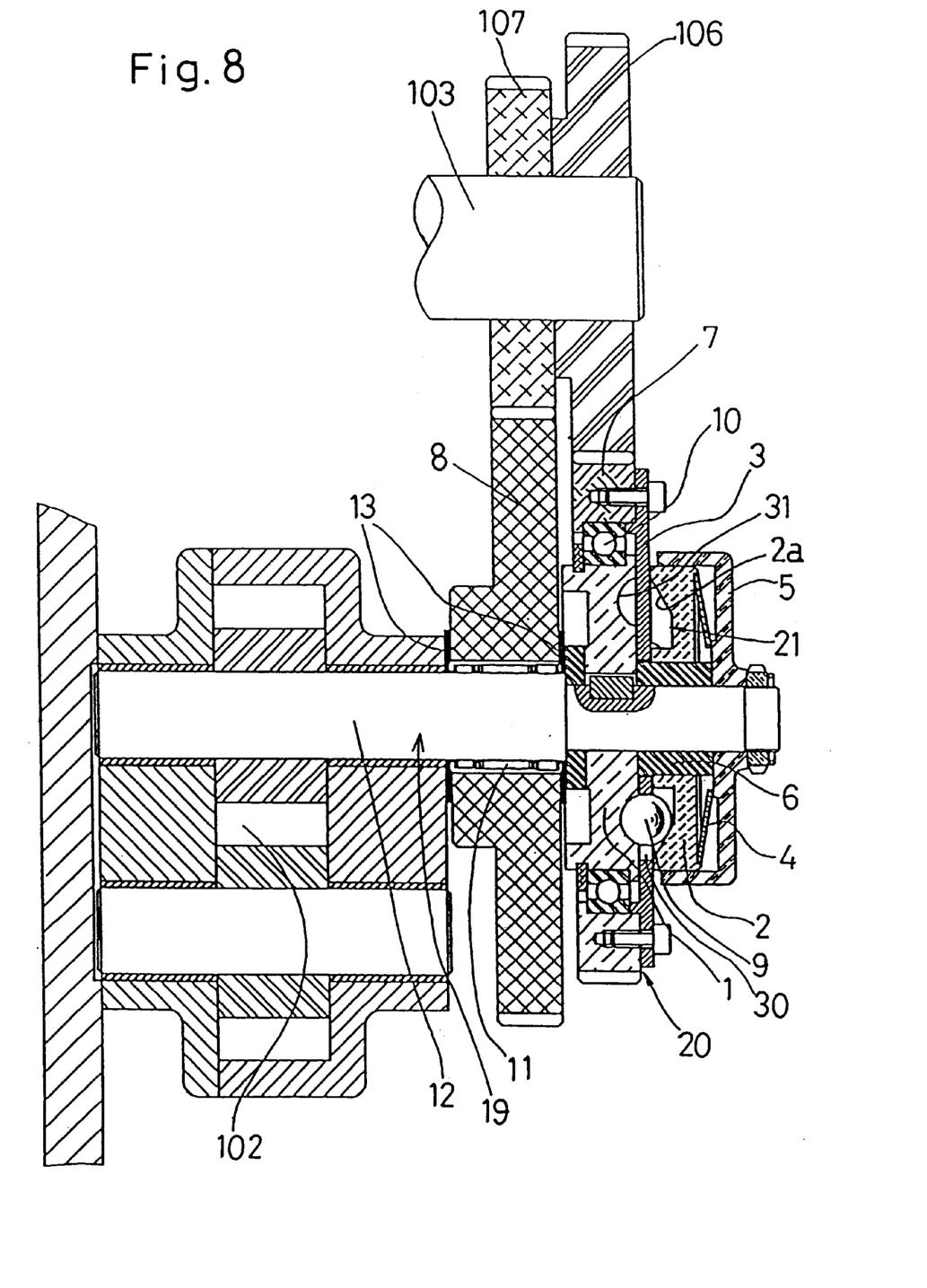
FIG. 8 is a longitudinal sectional view of the torque responsive rotation control device according to a second preferred embodiment of the present invention.

The torque responsive rotation control device according to a second preferred embodiment of the present invention is shown in FIG. 8. In this embodiment, the crankshaft 103 of the engine includes a second crank gear 107 mounted thereon under an interference fit in a coaxial relation with the first crank gear 106 and, on the other hand, the output shaft 12 includes an input stand-by gear 8 mounted thereon in a coaxial relation with the input gear 7 meshed with the first crank gear 106, said input stand-by gear 8 being meshed with the second crank gear 107 on the crankshaft 103. The input stand-by gear 8 is mounted on the output shaft 12 by means of an one-way clutch 11 for rotation only in one direction. This one-way clutch 11 is so designed and so configured that only when the number of revolutions of the input stand-by gear 8 exceeds the number of revolutions of the output shaft 12, a torque can be transmitted from the input stand-by gear 8 onto the output shaft 12.

Assuming that the number of teeth of the first crank gear 106 is expressed by $\alpha$, the number of teeth of the input gear 7 is expressed by $\beta$, the number of teeth of the second crank gear 107 is expressed by $\gamma$, and the number of teeth of the input stand-by gear 8 is expressed by $\delta$, the relation between the reduction gear ratio of the input gear 7 relative to the first crank gear 106 and the reduction gear ratio of the input stand-by gear 8 relative to the second crank gear 107 is determined as follows:

$$(\beta/\alpha)<(\delta/\gamma)$$

Other structural features of the torque responsive rotation control device shown in FIG. 8 than those described above are similar to those of the torque responsive rotation control device shown in FIG. 1 in connection with the first embodiment of the present invention.

In this structure, when the engine is driven the second crank gear 107 is also driven simultaneously with the first crank gear 106. In view of the relation between the reduction gear ratio of the input gear 7 relative to the first crank gear 106 and the reduction gear ratio of the input stand-by gear 8 relative to the second crank gear 107 as discussed above, under a condition in which the balls 9 and the torque cam 1 are engaged with each other, that is, under a torque value smaller than the preset torque of the torque limiter mechanism 21, the number of revolutions of the output shaft 12 exceeds the number of revolutions of the input gear 8 at all times and, therefore, the one-way clutch 11 is driven idle with no torque consequently transmitted from the second crank gear 107.

However, in a rotational region in which the torque value exceeds the preset torque of the torque limiter mechanism 21, the input gear 7 is driven relatively to the output shaft 12 with the number of revolutions of the input stand-by gear 8 exceeding the number of revolutions of the output shaft 12 and, therefore, the one-way clutch 11 is engaged with the output shaft 12 to allow the output shaft 12 to be driven at a speed determined by the reduction gear ratio of the input stand-by gear 8 relative to the second crank gear 107.

Figure 9:
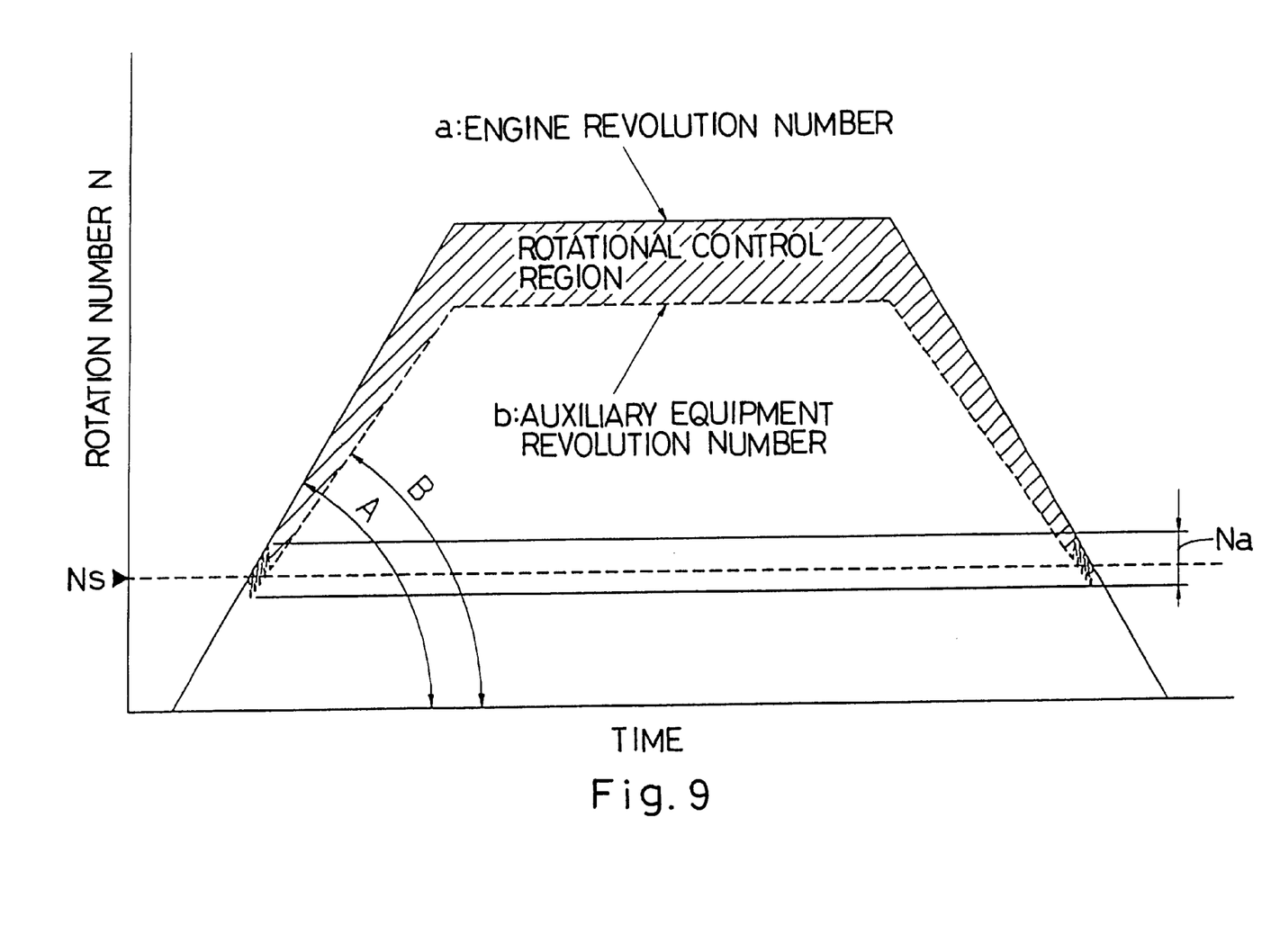
FIG. 9 is a schematic diagram showing the operation of the torque responsive rotation control device according to the second embodiment of the present invention.

As discussed above, according to the second embodiment of the present invention, switching is possible between a high-speed gear pair, including the first crank gear 106 and the input gear 7, and a low-speed gear pair, including the second crank gear 107 and the input stand-by gear 8, in dependence on the torque or number of revolutions of the engine. Accordingly, unlike the case in which the engine auxiliary equipment is coupled direct with the engine as is the case with the prior art, the number of revolutions of the engine auxiliary equipment can advantageously be restricted to a necessary and sufficient level at a high rotational region of the engine while securing the performance of the engine auxiliary equipment at a low speed region. For this reason, not only can a loss of the engine power at a high speed region be avoided, but also the engine auxiliary equipment can be manufactured compact in size. Specifically, referring to FIG. 9, a shaded area represents a rotation control region in which an energy loss can be recovered. In this figure, A represents the reduction gear ratio of the gear pair including the first crank gear 106 and the input gear 7, and B represents the reduction gear ratio of the gear pair including the second crank gear 107 and the input stand-by gear 8.

Figure 10:
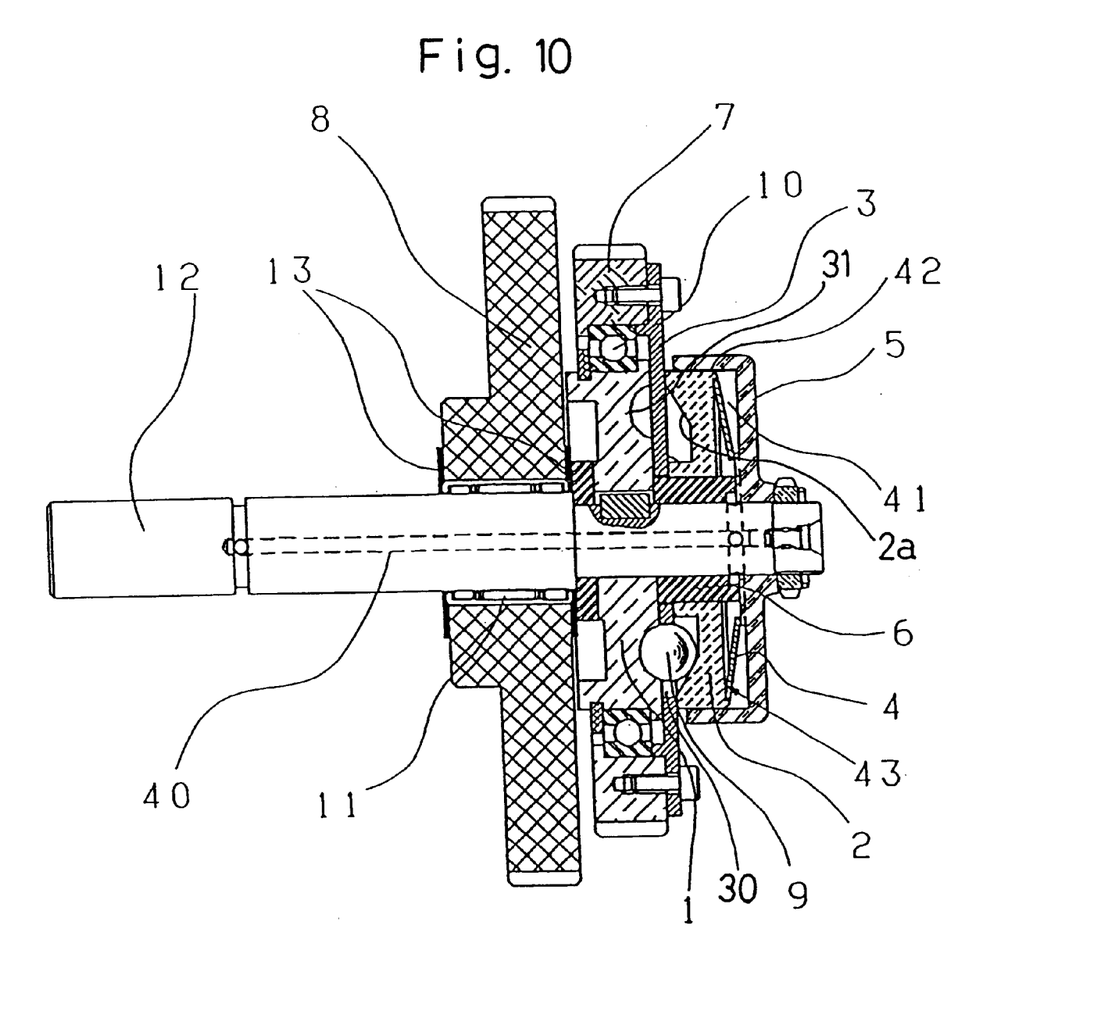
FIG. 10 is a longitudinal sectional view of the torque responsive rotation control device according to a third preferred embodiment of the present invention.

FIG. 10 illustrates the torque responsive rotation control device according to a third preferred embodiment of the present invention. In this embodiment, the torque responsive rotation control device shown therein is substantially similar to that shown in FIG. 8 and described in connection with the second embodiment of the present invention, but differs therefrom in that a dumper mechanism 43 is employed. More specifically, the output shaft 12 has an oil passage 40 defined therein. On the other hand, a space delimited by the presser member 2, the support cylinder 5 and the spacer 6 and in which the spring washer 4 is accommodated is utilized as an oil chamber 41 which is communicated with the oil passage 40. One end of the oil passage 40 remote from the oil chamber 41 is communicated with the oil pump 102 shown in FIG. 8 so that a predetermined quantity of oil can be supplied to the oil chamber 41, shown in FIG. 10, through a check valve (not shown). The oil so supplied into the oil chamber 41 is in turn discharged mainly through a discharge passage that is defined by an annular gap 42 delimited between the outer periphery of the presser member 2 and the inner periphery of the support cylinder 5. This oil chamber 41 and the annular gap 42 altogether constitutes the dumper mechanism 43.

Where the dumper mechanism 43 is employed as discussed above, the damping effect between the balls 9 and the presser member 2 can be increased at the time of selective engagement and disengagement of the torque cam 1 and, therefore, transmission of the torque can be accomplished more smoothly.

Figure 11:
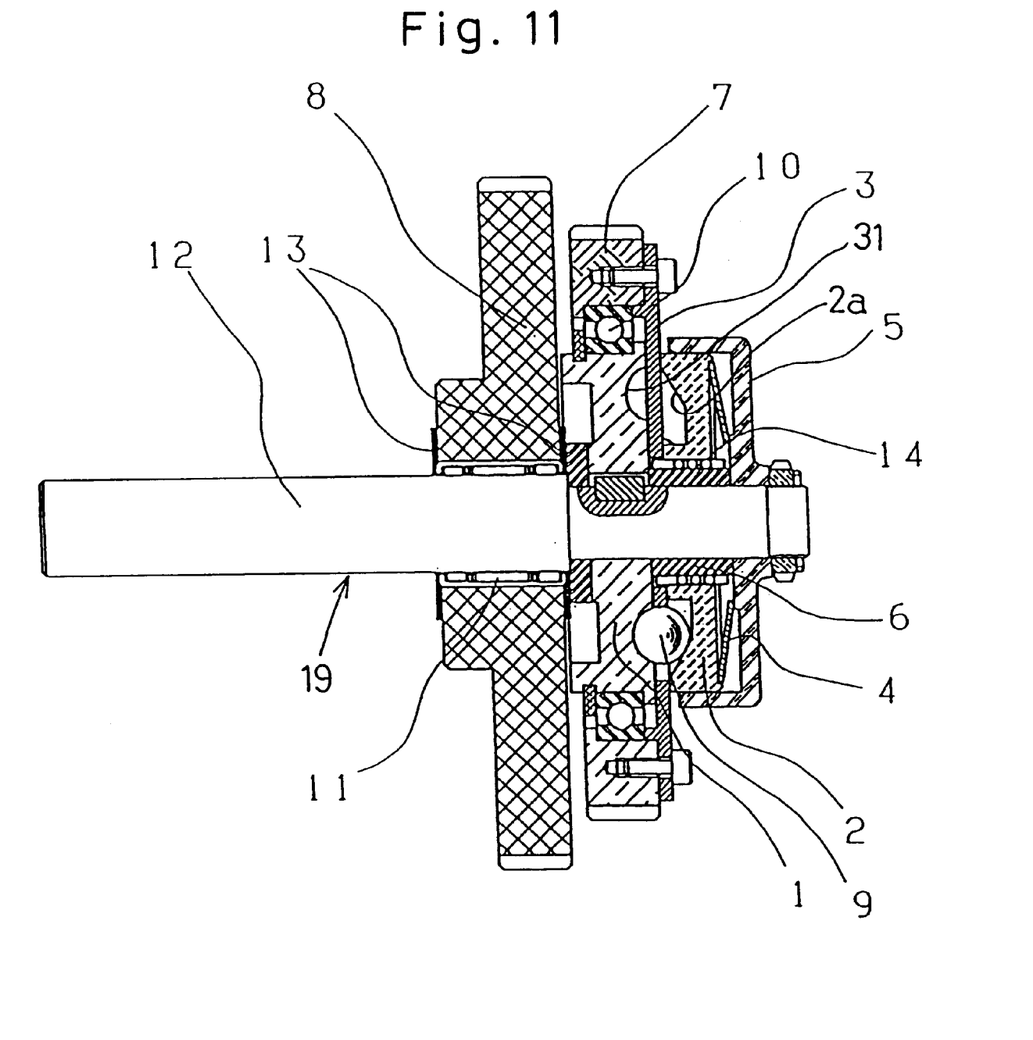
FIG. 11 is a longitudinal sectional view of the torque responsive rotation control device according to a fourth preferred embodiment of the present invention.

FIG. 11 illustrates the torque responsive rotation control device according to a fourth preferred embodiment of the present invention. In this embodiment, the torque responsive rotation control device shown therein is substantially similar to that shown in FIG. 8 and described in connection with the second embodiment of the present invention, but differs therefrom in that a ball bushing 14, which is a mechanical element necessary to provide a rolling contact is interposed between the spacer 6 and the presser member 2 to decrease an axial sliding resistance between the spacer 6 and the presser member 2. In view of the fact that the axial sliding resistance between the spacer 6 and the presser member 2 is reduced by the provision of the ball bushing 14, the response at the time of selective engagement and disengagement of the torque cam can be increased so that the hysteresis of the torque transmission which would results from switching of the gear pairs during increase or decrease of the number of revolutions of the engine can advantageously be reduced. It is, however, to be noted that a similar function can be accomplished even though a mechanical element capable of providing the rolling contact, such as, for example, a linear slide or a ball slide is employed in place of the ball bushing 14.

Figure 12:
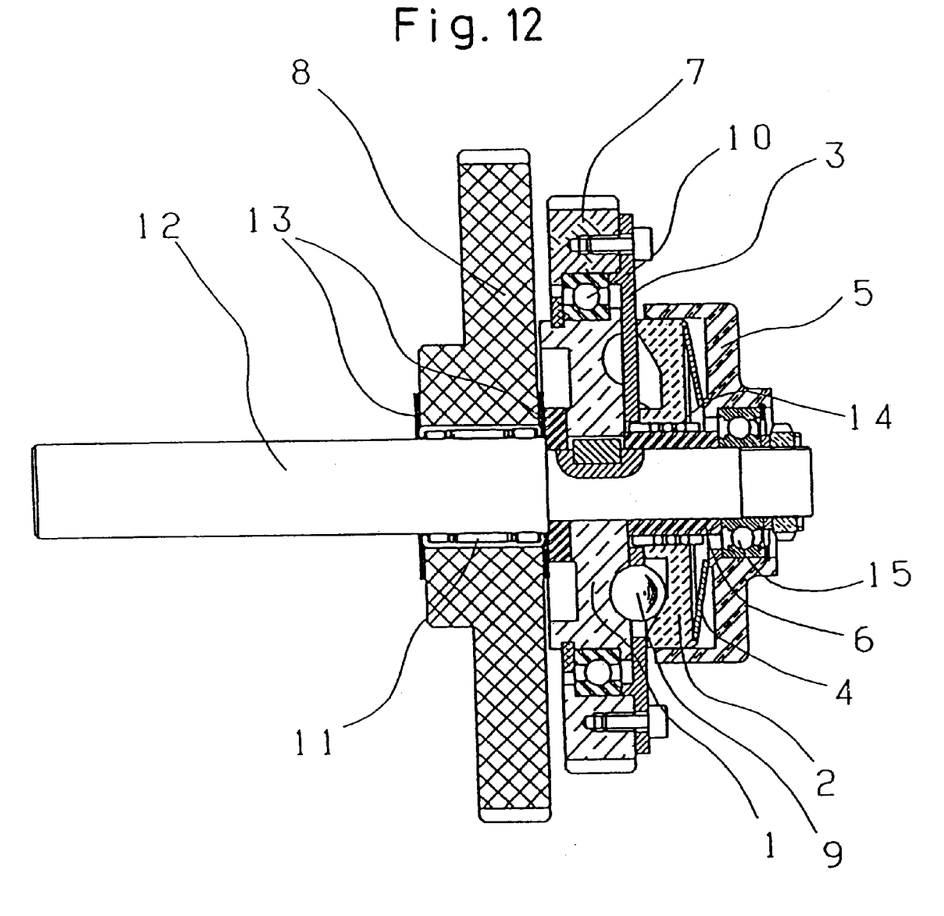
FIG. 12 is a longitudinal sectional view of the torque responsive rotation control device according to a fifth preferred embodiment of the present invention.

A longitudinal sectional representation of the torque responsive rotation control device according to a fifth preferred embodiment of the present invention is shown in FIG. 12. In this embodiment, the torque responsive rotation control device is substantially similar to that shown in FIG. 11 and described in connection with the fourth embodiment of the present invention, but differs therefrom in that a rolling contact bearing such as, for example, a ball bearing 15 is interposed between the support cylinder 5 and the output shaft 12 to permit one of the support cylinder 5 and the output shaft 12 to rotate relative to the other thereof.

Where as a result of increase of the number of revolutions of the engine the driving torque increases to a value higher than the pressing force of the spring washer 4 that is used to urge the presser member 2, the torque limiter mechanism 21 is brought into operation, accompanied by a relative rotation between the input gear 7 and the output shaft 12. At this time, both of the presser member 2 and the spring washer 4 undergo rotation relative to the output shaft 12. According to the embodiment shown in FIG. 12, the provision of the ball bearing 15 interposed between the support cylinder 5 and the output shaft 12 is effective to avoid this relative rotation between the spring washer 4 and the output shaft 12, that is, to prevent the support cylinder 5 from rotating as accompanied by rotation of the output shaft 12, thereby to minimize a possible frictional wear of the spring washer 4 slidingly contacting the support cylinder 5.

Figure 13:
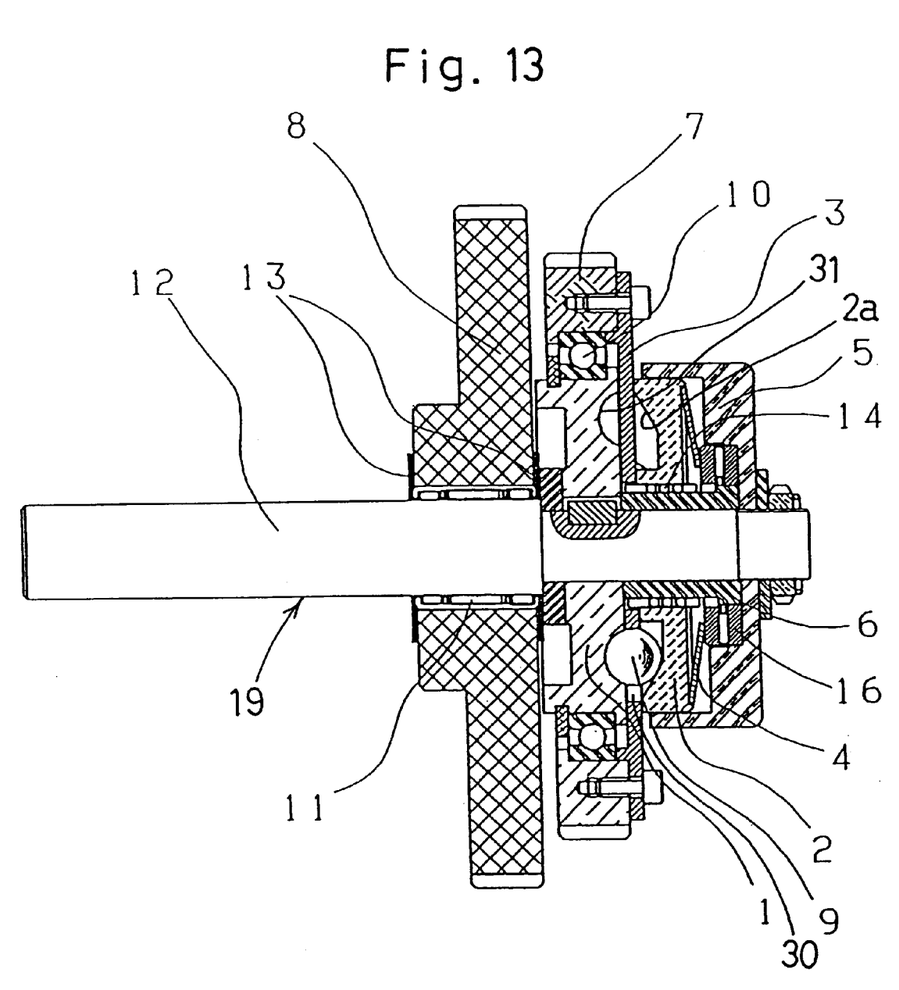
FIG. 13 is a longitudinal sectional view of the torque responsive rotation control device according to a sixth preferred embodiment of the present invention.

It is to be noted that in place of the ball bearing 15 interposed between the support cylinder 5 and the output shaft 12 as shown in FIG. 12, a roller bearing 16 such as a thrust roller bearing may be interposed between the support cylinder 5 and the spring washer 4 as shown in FIG. 13 in connection with a sixth preferred embodiment of the present invention. In this sixth embodiment, the spring washer 4 is held in direct contact with one of races of the thrust roller bearing 16. Even in this structure, any possible frictional wear of the spring washer 4 which would result from the relative rotation between the presser member 2 and the output shaft 12 can be suppressed advantageously.

Figure 14A:
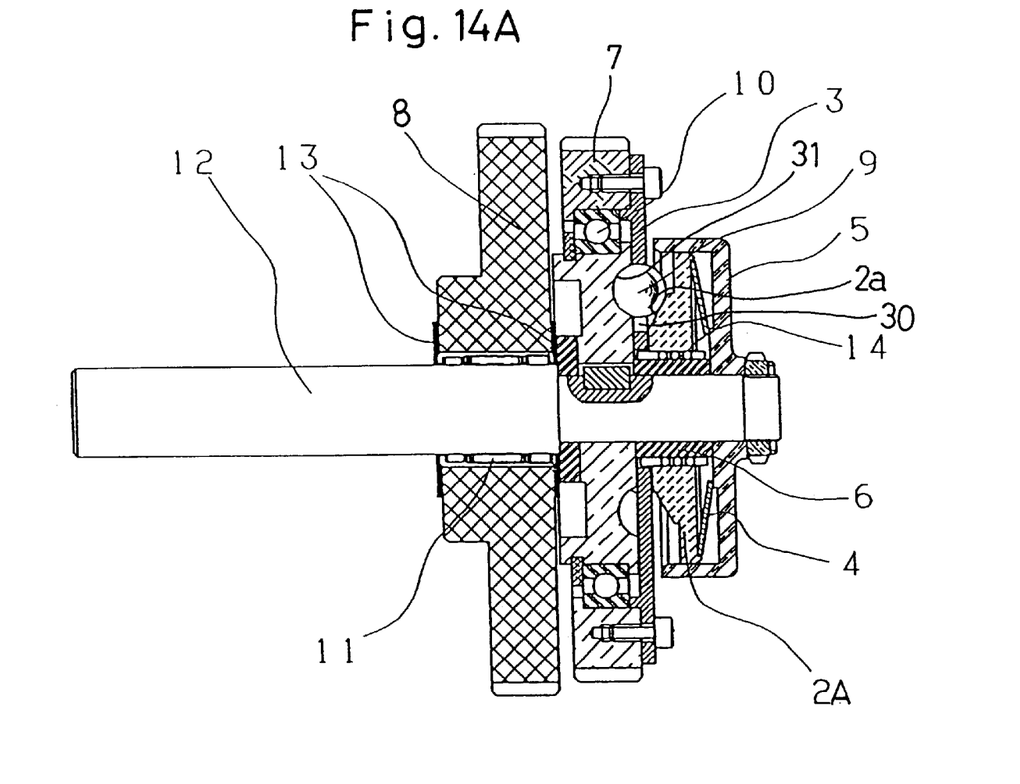
FIG. 14A is a longitudinal sectional view of the torque responsive rotation control device according to a seventh preferred embodiment of the present invention.
Figure 14B:
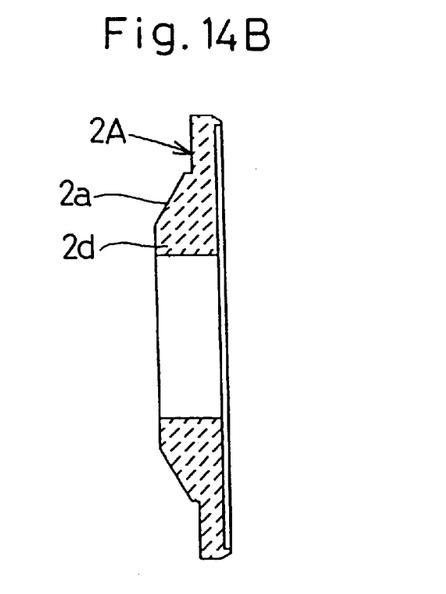
FIG. 14B is a sectional view of the presser member used in the torque responsive rotation control device shown in FIG. 14A.

FIGS. 14A and 14B illustrates a seventh preferred embodiment of the present invention. In this embodiment, although the torque responsive rotation control device shown in FIG. 14A is substantially similar to that described in connection with the fourth embodiment of the present invention with reference to FIG. 11, the presser member 2A is employed of a design wherein as best shown in FIG. 14B a center area of one of the opposite surfaces of the presser member 2 adjacent the input cage 3 protrudes axially as indicated by 2d to represent a generally truncated cone. A side face of the truncated cone forms a radially outwardly inclined pressing face 2a.

According to the structure shown in FIG. 14A, since the presser member 2A has no axially inwardly extending annular recess found in the presser member 2 employed in any one of the foregoing embodiments of the present invention, the pressing face 2a of the presser member 2A formed on the central protrusion 2d that contacts the balls 9 can easily be machined and, therefore, the presser member 2A can advantageously be manufactured precisely and at a reduced cost.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A torque responsive rotation control device which comprises:

an input-side rotary member and an output-side rotary member rotatable about a common axis and independent from each other;

a cage having a plurality of pockets defined therein so as to extend radially and including balls movably accommodated within the corresponding pockets, said cage being provided on one of the input-side and output-side rotary members;

the other of said input-side and output-side rotary members having a generally annular cam groove defined therein in coaxial relation to said common axis, said cam groove being shaped to have a distance from said common axis varying continuously;

a presser member movable in an axial direction and having a pressing face defined therein in coaxial relation to an axis of rotation thereof and inclined against the axis, said presser member being axially displaceably provided with said pressing face confronting said cam groove in said other of the input-side and output-side rotary members; and an elastic element applying a pressing force to the presser member to cause the pressing face to urge the balls towards said one of the input-side and output-side rotary members.

2. The torque responsive rotation control device as claimed in claim 1, wherein said cam groove is of a shape having the distance from said common axis that varies in a fashion similar to a generally sinusoidal wave, and wherein the pockets in said cage is equal in number to the number of dales of the sinusoidal wave occurring in one complete circumference of the cam groove and are equidistantly spaced from each other.

3. The torque responsive rotation control device as claimed in claim 1, further comprising an input gear; an input stand-by gear provided on an output shaft of the output-side rotary member through a one-way clutch for rotation in one direction; and first and second engine-side gears engageable with the input gear and the input stand-by gear, respectively, said first and second engine-side gears being mounted on a common drive shaft, and wherein a relation among respective numbers of teeth of the various gears being so chosen that only when the number or revolutions of the input stand-by gear exceeds the number of revolution of the output shaft, rotation can be transmitted from the second engine-side gear to the output shaft through the input stand-by gear and the one-way clutch.

4. The torque responsive rotation control device as claimed in claim 1, further comprising a support cylinder fitted over an outer periphery of the presser member and defining an oil chamber for applying a hydraulic pressure to the presser member in an axial direction, and an oil passage for supplying oil to the oil chamber, a discharge passage defined between the outer periphery of the presser member and an inner surface of the support cylinder engaging the outer periphery of the presser member, and wherein said oil chamber, said oil passage and said discharge passage altogether define a dumper.

5. The torque responsive rotation control device as claimed in claim 1, wherein said output-side rotary member comprises a torque cam having the cam groove defined therein and rotatable together with an output shaft, and said input-side rotary member being constituted by an input gear, rotatably mounted on an outer periphery of the torque cam through a rolling contact bearing and the cage fitted to this input gear, and wherein said presser member is supported by the output shaft for displacement axially of the output shaft through a mechanical rolling contact element.

6. The torque responsive rotation control device as claimed in claim 1, wherein said output-side rotary member comprises a torque cam having the cam groove defined therein and rotatable together with an output shaft, and said input-side rotary member being constituted by an input gear, rotatably mounted on an outer periphery of the torque cam through a rolling contact bearing and the cage fitted to this input gear; further comprising an elastic element support member for supporting the elastic element being provided on the output shaft; and a bearing interposed between the elastic element support member and the output shaft for permitting a relative rotation between the elastic element support member and the output shaft.

* * * * *